Patented Sept. 29, 1936

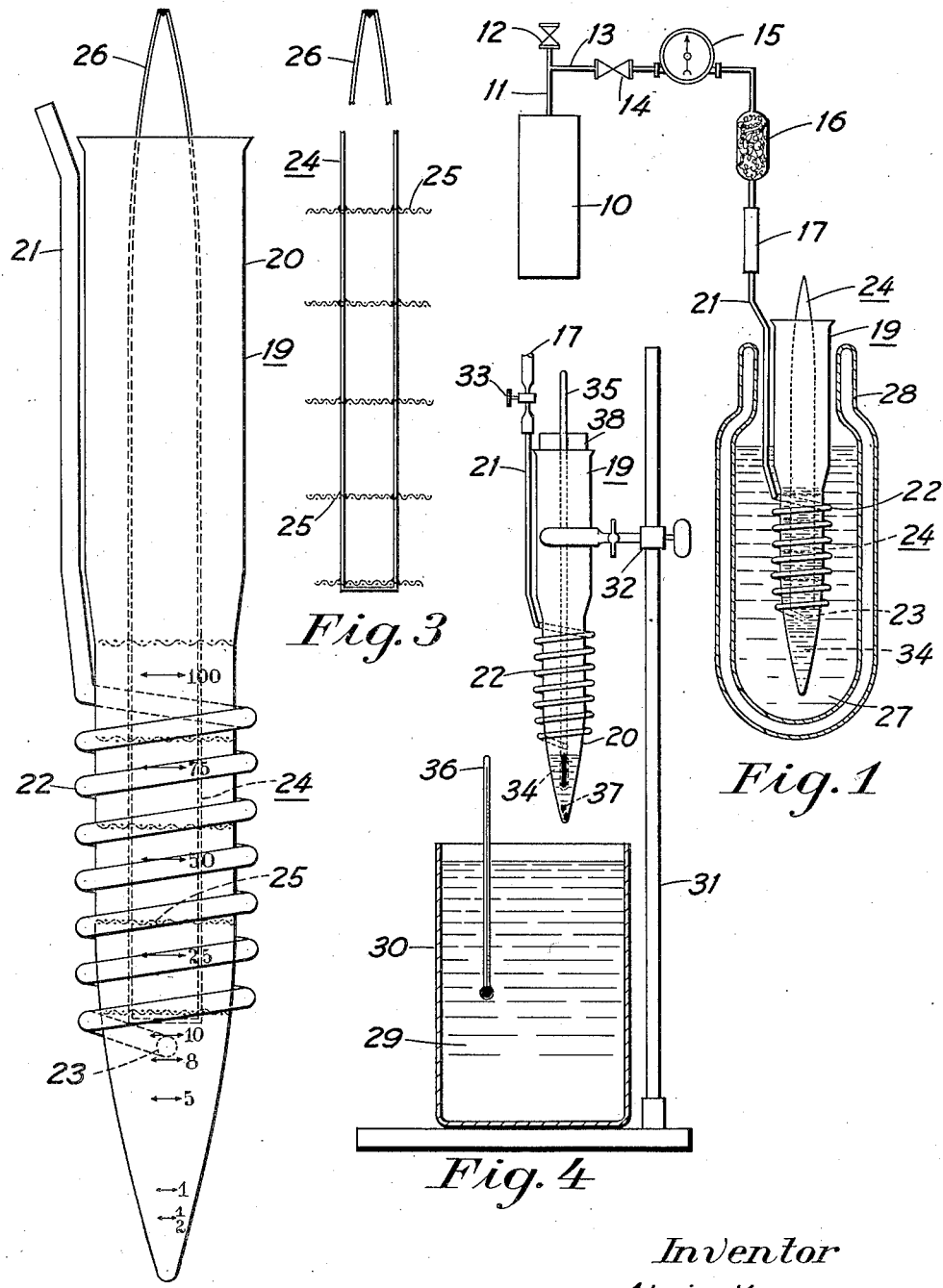

2,055,628

UNITED STATES PATENT OFFICE 2,055,628

METHOD FOR GAS ANALYSIS

Alois Kremser, Berkeley, Calif., assignor to Standard Oil Company of California, San Francisco, Calif., a corporation of Delaware Application February 9, 1934, Serial No. 710,494

5 Claims. (Cl. 23—232)

This invention relates to the determination of the constituents of gases and particularly to a method for the precise measurement of the proportions of certain heavier hydrocarbons, such as pentanes in a mixture of these with butane, propane, ethane and methane, as may occur in certain residue or effluent gases from a natural gasoline extraction plant.

Natural gasoline plants are primarily intended to extract all of those available hydrocarbons from natural gas that may economically be included in a stable motor fuel. These are normally the fractions which are liquid at atmospheric temperature and under a pressure of not over one or two atmospheres, and comprise pentane, hexane, heptane, and heavier. It is usual to call them "pentanes plus" and they will be so referred to hereafter.

In the operation of a natural gasoline plant it is essential to analyze or measure the richness of pentanes plus content of both the incoming gas and the outgoing gas, in order to obtain maximum efficiency of extraction. Heretofore there have been many expedients for this determination, such as condensing a sample in a tube or coil submerged in a low temperature bath of carbon dioxide and ether, as described in the patent to Davidson, No. 1,845,247; or by simple compression and cooling; or by absorption in heavier oil, or in activated charcoal, or silica gel or the like, with subsequent extraction followed by a rapid "weathering" or boiling away of the lighter components to a definite temperature and then estimating the pentanes plus from the residue. These methods are either not sufficiently accurate for operation on gases of low pentanes plus content, such as outgoing gas from a plant, or are so slow and tedious to perform that they are quite expensive, and hence are not practicable. Furthermore, if adequate accuracy of analysis of the condensed or absorbed sample is to be obtained, it is necessary that such analysis be obtained by a slow, delicate and expensive fractionation, which obviously is not suited to field testing or to routine control of plant operation.

It is an object of this invention to provide a method for quickly and accurately determining the proportion of heavier or less volatile hydrocarbons or similar materials, in a mixture of those hydrocarbons with lighter or more volatile hydrocarbons.

Another object is to provide a method for determining the proportion of pentanes plus in a gaseous mixture of these hydrocarbons with lighter fractions such as propane, butane and the like.

Another object is to provide a method for the purpose described which will be simple and inexpensive and which will give practical accuracy when performed and used by relatively unskilled operators.

These and other objects and advantages will be further apparent from the following description and from the appended drawing, which forms a part of this specification and illustrates a preferred embodiment of this invention. It will be understood that numerous modifications and changes could be made both to the method and the specific apparatus here described for carrying it out, without departing from the essential features of the invention.

In the drawing:

Figure 1 is a diagram of an apparatus embodying this invention, as it would be used for absorbing outlet gases from a natural gasoline plant.

Figure 2 is an enlarged detail of the main tube of the absorbing apparatus of Figure 1.

Figure 3 is an enlarged detail of a form of baffle structure or contact promoting device for the main tube when the latter is used as an absorber, as in Figure 1.

Figure 4 is a diagram of the main tube of the apparatus and a bath suitable for weathering the sample and the liquid in which it has been absorbed.

In the drawing and particularly referring to Figure 1, the numeral 10 represents a source of gas such as a final absorption or rectification column of a natural gasoline plant, from which residue gas is discharged through the pipe 11 and the valve 12 to the atmosphere or to a gas disposal system (not shown). A sample of this effluent gas may be led off from pipe 11 through a branch pipe 13, valve 14, meter 15 and calcium chloride packed drying tube 16 to a flexible rubber tube 17 which is connected to the inlet of the absorber, generally designated 19.

Absorber 19 is shown in greater detail in Figure 2 and, in the example given, comprises a main tube 20, which may conveniently be a standard glass centrifuge tube, A. S. T. M. D-96-28 Style 480, to which has been sealed about 5 inches of 1⅛ inch O. D. thin wall glass tubing, giving an overall length of about 12 inches. The centrifuge tube specified is convenient to use as it is of suitable size, is already calibrated in cubic centimeters, which, although not consistent with other units in the description, are fairly convenient, and is tapered to a point in order to facilitate measurement of small quantities of residue, but another form or shape obviously could be substituted. The gas inlet to the absorber 19 is preferably a ¼ inch O. D. standard wall glass tube 21, extending downwardly from the upper end to a point about midway of the tube 20 where it is wound in a helix about the tube 20, forming a cooling coil 22, and finally is sealed thereinto at a point 23 near its lower end, so that the incoming gas may bubble through and adequately contact the absorption liquid in the tube 20, as will be explained below.

A baffle structure generally designated 24, and detailed in Figure 3, is preferably placed in tube 20, to promote gas-liquid contact therein. This may consist of a plurality of fine wire mesh discs 25, fitting closely in the bore of tube 20 and soldered to a brass wire loop or handle 26, as shown, or may equally well be a bag of glass beads, tubes, steel chain, etc.

Referring again to Figure 1, the absorber unit 19 is partially submerged in a cooling bath 27, preferably contained in a wide mouth one quart vacuum or thermos bottle 28. The helix 22 of the gas cooling coil should be covered by the bath. The proportions given above for the absorber 19 are suitable for such a container. The cooling bath 27 may be a slush of solid carbon dioxide and ether or liquefied butane, or more conveniently, liquefied propane alone. The evaporation of the former mixtures gives a lower temperature (about −100° F.) and is more satisfactory for determinations of gases low in propane and butane content, but is not as advantageous as liquefied propane alone (about −45° F.) for gases rich in propane and butane, due to excessive absorption of these constituents from the sample because of the lower temperatures attained.

The weathering equipment illustrated in Figure 4 comprises a weathering bath of water 29 in a suitable container 30, preferably holding about one gallon. A convenient stand 31 with a clamp 32 may be provided to hold the absorber 19 in the weathering bath 29 or in the atmosphere above it as illustrated. A pinch cock 33 is desirable for closing off the rubber tube 17 while the weathering operation is performed. Two thermometers 35 and 36 are required for the absorber 19 and the bath 29, respectively. Thermometer 35 is preferably provided with a range of from +20 to +40° Fahrenheit for the example given.

The preferred method of operating the apparatus just described, for making an analysis according to this invention, embraces the following steps. The cooling bath 27 described above is poured into bottle 28 and the absorber unit 19 with baffle member 24 in place is inserted therein. Gas from source 10 is passed through meter 15 and drying tube 16 to purge them of air or gases remaining from a previous determination, after which absorber 19 is connected thereto by means of tube 17. A quantity of liquefied commercial butane, which should be precooled and entirely free of pentane plus fractions, is placed in absorber 19 so that all the baffle plates 25 are covered, which quantity, in the example given, is about 50–100 cc. It will be particularly noted at this time that this absorption medium is lighter or more volatile than the pentanes plus fractions that are to be absorbed therein, which is exactly opposite to the prior art practice. The commercial liquefied butane used in the development of this procedure consisted of about 36% normal butane, 61% isobutane and about 3% propane, thus fulfilling the conditions outlined above.

The gas from source 10 is then admitted, preferably at a rate of not more than about 15 cubic feet an hour, through the valve 14, meter 15, drying tube 16, and cooling helix 22 into the lower part of absorber 19 where it bubbles upwardly through the absorption medium which eventually constitutes the sample 34, the baffle plates 25 serving to promote intimate contact between the gas and the liquid. This absorption of the gas is continued until at least 1 cc. of liquid pentanes plus have been absorbed as will be indicated by an approximately equivalent increase in volume of liquid in the absorber 19. The absorber 19 is then disconnected from the drying tube 16 and a few cc. of liquefied butane is poured down the gas inlet tube 21 to wash out any condensate from helix 22 into tube 20. Rubber tube 17 at the end of tube 21 is closed by means of pinch cock 33. Baffle member 24 is removed from tube 20 and the adhering liquid is rinsed into the tube by means of a few cc. of liquefied butane. More butane is added if necessary until the volume of sample 34 in tube 20 is about 100 cc.

The sample 34 in the absorber 19 is then weathered or allowed to partially evaporate, preferably but not necessarily according to the following procedure. Two grains of new 8–14 mesh charcoal 37 are dropped into tube 20 to serve as a focal or starting point for bubbles and to prevent uneven ebullition. The weathering bath 29 is brought to a temperature of about 60°–70° F. and absorber 19 is suspended in a vertical position over it, out of contact with the liquid 29, until about 10% or 10 cc. of the sample 34 has evaporated, when the danger of boiling over is substantially past. The absorber tube 19 is then lowered until the tip of tube 20 is submerged and the weathering is allowed to proceed until the sample 34 has been reduced in volume to about 15 cc. At this stage the tube 19 is removed from weathering bath 29 to the position shown in Figure 4 and thermometer 35 is introduced through a slotted cork 38 so that the bulb of the thermometer is just above the bottom of tube 20.

The sample 34 is permitted to continue evaporating and the thermometer 35 is watched closely until a temperature of 32°–34° F. is reached. The thermometer is then quickly removed, the top of tube 20 is closed to prevent further evaporation and a reading is taken of the volume of the residue 34 in cc. The exact temperature of this reading is dependent upon barometric pressure, and for very accurate determinations should be governed by the following table:

| Barometric pressure | | Final temperature |
| --- | --- | --- |
| mm. | Hg. | Deg. Fahr. |
| 764 | 756 | 34.0 |
| 756 | 748 | 33.5 |
| 748 | 740 | 33.0 |
| 740 | 732 | 32.5 |
| 732 | 724 | 32.0 |

Broadly speaking this final weathering temperature is preferably about equal to or slightly above the boiling point of the homologous constituent of the sample 34 that is next lighter than the lightest constituent which it is desired to determine. In the example given, the temperature used is slightly in excess of the boiling point, at atmospheric pressure, of normal butane, which fulfills the above requirement when it is desired to determine the quantity of pentanes plus in a gaseous hydrocarbon mixture. Under these conditions, not all of the lighter constituents will be evaporated, due to the well-known inability of this type of apparatus to make a sharp separation between the lighter and the heavier constituents. In consequence, for the example given, a factor of about 0.4 has been determined by numerous tests to represent the multiplier which is used to convert the volume of residue into the volume of pentane plus in the original sample. Similar factors may obviously be determined by analogous methods when applying this invention to other materials or using different absorption media.

The residual volume just determined may therefore be converted into cc. of pentanes plus by the factor 0.4 in the equation:

Cc. pentanes plus=residue in cc.×0.4

The pentanes plus content in gallons per thousand cubic feet of gas tested, which is the customary means of expressing this value, may be computed from the following equation, in which the factor 0.2642 is the standard multiplier for converting cubic centimeters to gallons (.0002642) multipled by 1000 to give gallons per 1000 cubic feet $$\text{Gal. per 1000 cu. ft.} = \frac{\text{cc. of pentanes plus} \times 0.2642}{\text{Corrected vol. of gas metered in cubic feet at standard conditions}}$$

Or the gallons of pentanes plus per thousand cubic feet of gas tested may be derived directly from the residue volume above by substituting the first equation above in the second, thus making the multiplying factor 0.2642×0.4=0.1057 in the equation:

$$\text{Gal. per 1000 cu. ft.} = \frac{\text{cc. residue} \times 0.1057}{\text{Corrected vol. of gas metered in cu. ft. at standard conditions}}$$

The invention appears to reside in a method of determining the proportion of a heavier constituent or a group of constituents of a gaseous mixture by absorbing a quantity of the said mixture in a liquefied medium that is lighter or more volatile than the constituent to be determined, and then allowing the more volatile medium and the lighter constituents absorbed to evaporate or be weathered off under controllable conditions, the residue forming an indication of the proportion of the heavier constituent.

I claim:

1. A method of determining the proportion of pentanes plus in a gaseous mixture containing lighter constituents, comprising the steps of absorbing a quantity of said gaseous mixture in a liquefied hydrocarbon medium that is more volatile than pentanes plus, said absorption being carried out at a temperature below the boiling point of said medium, raising the temperature of the sample comprising said medium together with its dissolved pentanes plus and lighter constituents of the gaseous mixture to a point equal to or slightly above the boiling point of the next lighter homologous constituent of said sample, measuring the residue, and applying a predetermined conversion factor to the numerical value so obtained.

2. A method of determining the proportion of pentanes plus in a gaseous mixture containing lighter constituents, comprising the steps of absorbing a quantity of said gaseous mixture in liquefied butane, said absorption being carried out at a temperature below the boiling point of butane, raising the temperature of the sample comprising said butane together with its dissolved pentanes plus and lighter constituents of the gaseous mixture to a point within approximately two degrees Fahrenheit of the boiling point of normal butane at the pressure used, measuring the residue, and applying a predetermined conversion factor to the numerical value so obtained.

3. A method of determining the proportion of pentanes plus in a gaseous hydrocarbon mixture containing lighter constituents, comprising the steps of absorbing a quantity of said gaseous mixture in liquefied butane at a temperature not higher than the boiling point of propane, raising the temperature of said butane and absorbed hydrocarbons to approximately 34 degrees Fahrenheit at normal barometric pressure of 760 mm. of mercury, measuring the residue, and applying a predetermined conversion factor to the numerical value so obtained.

4. A method of determining the proportion of pentanes plus in a gaseous hydrocarbon mixture containing lighter constituents, comprising the steps of absorbing a quantity of said gaseous mixture in liquefied butane at a temperature below about −45° F., evaporating a portion of said butane and the lighter of said absorbed hydrocarbons by slowly warming the resulting liquid mixture to about 34° F., at normal barometric pressure of 760 mm. of mercury, measuring the residue, and applying a predetermined conversion factor to the numerical value so obtained.

5. A method according to claim 4, in which the quantity of pentanes plus, and the volume of the residual liquid is expressed in cubic centimeters, and the conversion factor is approximately 0.4.

ALOIS KREMSER.